United States Patent Office 3,258,900
Patented July 5, 1966

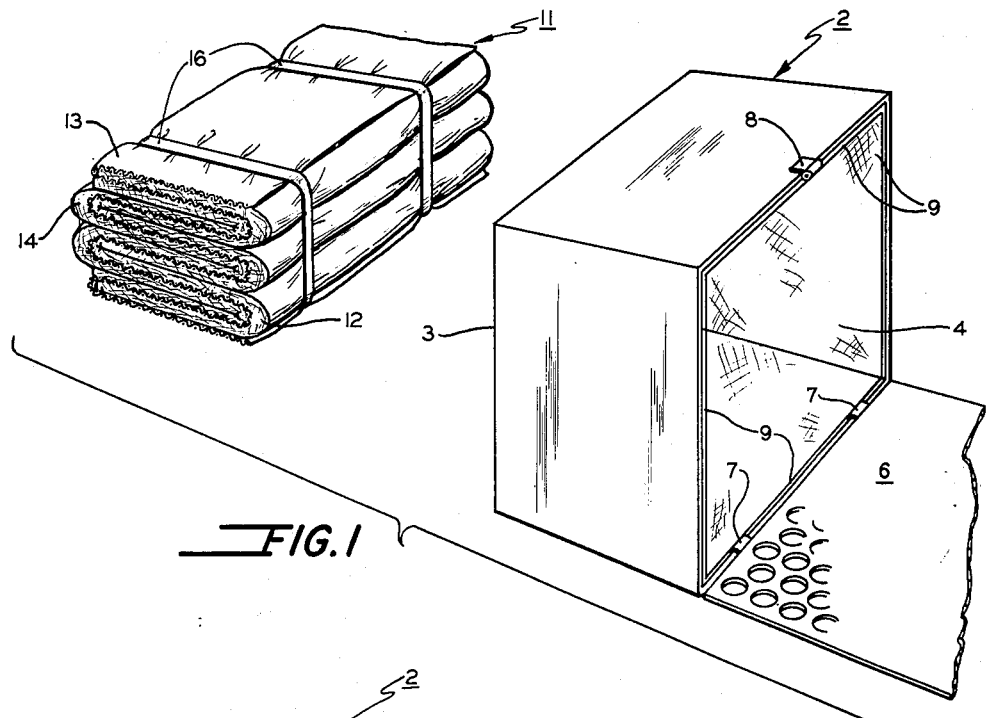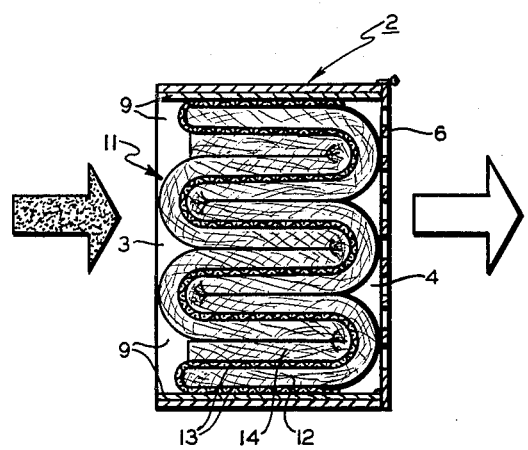

3,258,900
UNIT FILTER ASSEMBLY
John D. Harms, Valley Station, Ky., assignor to American Air Filter Company, Inc., Louisville, Ky., a corporation of Delaware
Filed Aug. 6, 1963, Ser. No. 300,207
6 Claims. (Cl. 55—485)

The present invention relates to a unit type filter and more particularly to a novel unit filter media support frame and filter media cartridge assembly.

In accordance with the present invention, a unit filter assembly is provided which permits ready installation of a pleat-form replaceable filter media cartridge into sealing engagement with a filter media support frame in a minimum number of operating steps and with a minimum of parts. In addition, the present invention provides a pleat-form filter assembly which insures uniform spacing of the several pleats of the filter media within its frame and, which, at the same time, provides a prefilter and/or afterfilter arrangement. Further, the present invention provides a pleat-form filter media cartridge arrangement which can be substantially compressed in size to permit efficient shipping, storage and handling and which can be readily expanded to a preselected configuration in its support frame for filtering operations.

Various other features of the present invention will become obvious to one skilled in the art upon reading the disclosure set forth herein.

More particularly, the present invention provides a unit filter assembly comprising: an open-ended filter media support frame defining a gas flow passage therethrough; and, at least first and second sheets of flexible filter medium positioned in coextending faced relationship within the filter media support frame to extend in laminar filter media arrangement across the gas flow passage; at least one of the sheets of media being of expansible-compressible nature; the laminar filter media arrangement being folded in pleat-form within the support frame with the expansible-compressible sheet of medium being in expanded comparatively three dimensional form to urge the edges of the pleat-form media into sealing relationship against the inner wall of the open-ended support frame.

It is to be understood that various changes can be made in the arrangement, form and construction of the apparatus disclosed herein without departing from the scope or spirit of the present invention.

Referring to the drawing, which discloses an advantageous embodiment of the present invention:

FIGURE 1 is an exploded perspective view of the component parts of the novel unit filter assembly, disclosing a filter media cartridge in compressed and bound condition prior to assembly in the filter media support frame; and, FIGURE 2 is a cross-sectional view of the apparatus of FIGURE 1, disclosing the filter media cartridge in expanded and assembled position in the support frame structure.

The unit filter assembly as disclosed includes an open-ended filter media support frame 2 defining a gas passage therethrough and having an upstream gas inlet opening 3 and a downstream gas outlet opening 4. A perforated media retainer plate 6 is pivotally mounted to frame 2 along one edge of the downstream side thereof by means of hinges 7. A suitable latch 8 is provided along the opposite edge of the downstream side of the frame to hold the media retainer plate in position during gas treating operations. It is to be noted that an additional media retainer plate can be provided in a similar manner on the upstream side of support frame 2 if desired. Advantageously, support frame structure 2 and retainer plate 6 can be comprised of a rigid material, such as thin, lightweight metal, cardboard or thin laminated wood. In order to insure that filter media cartridge 11, described hereinafter, is in proper sealing engagement with the inner wall of support frame 2 when the cartridge is assembled into the frame, a soft, compressible liner 9 is provided along the inner wall of frame 2. Liner 9 can be made from any one of a number of suitable fiber glass materials or, if desired, a foam polyurethane, foam rubber, or felted material of a type known in the art can be used.

Filter cartridge 11 to be inserted in frame 2 as disclosed is comprised of three sheets of continuous flexible filter medium, namely outer sheets 12 and 14 and intermediate sheet 13, the sheets being positioned in coextending face relationship to provide a laminar filter media arrangement. It is to be understood that the sheets are held together by compression in a manner as described hereinafter or, if desired, the sheets can be bound to each other by a suitable adhesive or resin. Outer sheets 12 and 14 advantageously are comprised of expansible-compressible, comparatively three dimensional, fiber glass material of interconnected and bonded fibers having diameters in the range of approximately 15–25 microns. Intermediate sheet of media 13, which serves as the principal filter media, advantageously is comprised of a comparatively two dimensional fiber glass material, non-expansible, with the fibers thereof having diameters in the range of approximately 0.5–5 microns. As can be seen in the drawing, the laminar filter media cartridge arrangement 11 is folded into a plurality of side-by-side pleats for insertion into support frame 2. It is maintained in compressed position for storage, shipping and handling so that the media and accordingly the cartridge is of a depth of less than approximately one-half the depth of the media and cartridge when it is in expanded condition. A pair of spaced binder tapes 16, which can be of paper, are provided in endless fashion about the pleated media cartridge 11 to hold the cartridge in such compressed position.

In an assembly operation, it is only necessary to insert the bound and compressed filter cartridge 11 into support frame 2 and break tapes 16. Because of the expansible-compressible nature of the filter medium sheets 12 and 14, the cartridge 11 expands until the ends of the cartridge seal against the soft, compressible liner 9 extending along the inner wall of support frame 2. The perforated media retainer plate 6 is then swung into position and is held by means of latch 8 so that the entire unit assembly is ready for filtering operations. Thus, in accordance with the present invention, a filter media cartridge and support frame assembly is provided which permits ready installation and removal of the cartridge in the frame with a minimum of operating steps and with a minimum of parts.

It is to be noted that, if desired, a portion of the outer, expansible-compressible sheets 12 and 14 of adjacent pleats can be glued or fastened together in some suitable manner in order to determine the final pleat configuration when the cartridge is allowed to expand in the support frame for operation. It further is to be noted that advantageously sheets of expansible-compressible filter medium 12 and 14 are of a highly porous, low resistant material in comparison with the non-expansible intermediate sheet 13. For example, sheets 12 and 14 can have an air porosity of approximately 500 to approximately 1500 ft./min. velocity at 0.5 inch wg. resistance across the medium and advantageously an air porosity of approximately 1000 ft./min. velocity at 0.5 inch wg. resistance. Sheet 13 can have an air porosity of anywhere from approximately 5 to approximately 100 ft./min. velocity at 0.5 inch wg. resistance, depending upon the intended application of the filter. In addition it is to be noted that only one such expansible-compressible sheet need be utilized. Advantageously, such a sheet could be used along the upstream side of the cartridge to serve as a prefilter. However, if desired, the one sheet could be positioned along the downstream side as an afterfilter. With a single expansible-compressible sheet arrangement, it would be particularly advantageous to glue or otherwise fasten a portion of the single expansible-compressible sheet of medium of adjacent pleats in order to determine the final pleat configuration when the cartridge is allowed to expand in the support frame as aforedescribed. Finally, it is to be noted that in place of continuous sheets 12 and 14 sets of spaced continuous strips of expansible-compressible filter medium can be employed to further lower the overall resistance of the finally assembled laminated media.

The invention claimed is:

1. A unit filter assembly comprising:
   (a) an open-ended filter media support frame defining a gas flow passage therethrough;
   (b) a compressible liner extending along the inner wall of said filter media support frame; and,
   (c) a set of continuous flexible filter medium sheets including two outer sheets and one intermediate sheet of filter medium positioned in coextending, faced relationship within said support frame to extend in laminar filter media arrangement across said gas flow passage;
   (d) said outer sheets of filter medium serving as separating members for said intermediate sheet and being of expansible-compressible, comparatively three dimensional fiber glass material with interconnected and bonded fibers having diameters in the range of approximately 15–25 microns;
   (e) said intermediate sheet of medium being comprised of a non-expansible, comparatively two dimensional fiber glass material with fibers having diameters in the range of approximately 0.5–5 microns;
   (f) said laminar filter media arrangement being folded into a plurality of side-by-side pleats with facing portions of said expansible-compressible medium between adjacent pleats being glued together with the expansible-compressible sheets of media in expanded comparatively three dimensional form to urge the edges of said laminar pleated media into sealing relationship against said compressible liner extending along the inner wall of said open-ended filter media support frame the glued facing portions of said expansible-compressible media determining the final pleat configuration and spacing between adjacent pleat walls of said intermediate sheet when such outer expansible-compressible sheets of media are in expanded form.

2. A filter media cartridge packed for ready disposition in a filter media support frame comprising:
   (a) at least first and second sheets of flexible filter medium positioned in co-extending faced relationship to provide a laminar filter media arrangement;
   (b) at least one of said sheets of filter medium serving as a separating member for the other and being of expansible-compressible nature;
   (c) said laminar filter media arrangement being folded into a plurality of side-by-side pleats and compressed so that said separating sheet of medium of expansible-compressible nature is compressed to a depth less than approximately one-half the depth of said sheet in expanded condition with the spacing between adjacent pleat walls of said other sheet being proportionally decreased;
   (d) the facing portions of the expansible-compressible medium between adjacent pleats being glued together to determine final pleat configuration and spacing between adjacent pleat walls of said other sheet when the cartridge is allowed to expand in its filter media support frame; and
   (e) binder means comprising at least one releasable strip member fastened to retain said media in compressed condition until disposed for operation in a filter media support frame.

3. The apparatus of claim 2:
   (a) said binder means comprising a strip of paper tape fastened in endless fashion about said pleat form media.

4. The apparatus of claim 2:
   (a) said separating expansible-compressible sheet of medium being of a highly porous, low resistant nature in comparison to said other sheet of filter medium and positioned adjacent the upstream face of said other sheet of filter medium to serve as a prefilter therefor.

5. The apparatus of claim 2:
   (a) said expansible-compressible sheet of medium having an air porosity approximately 500 to approximately 1500 feet per minute velocity at 0.5 inch wg. resistance across the medium; and
   (b) said other sheet of medium having an air porosity of approximately 5 to approximately 100 feet per minute velocity at 0.5 inch wg. resistance across the medium.

6. The apparatus of claim 2:
   (a) and an open-ended filter media support frame defining a gas flow passage therethrough and adapted to surround said cartridge when said binder means is released with the expansible-compressible sheet of media engaging in sealed relationship against the inner wall of said open-ended support frame.

References Cited by the Examiner

UNITED STATES PATENTS

| | | | |
|---|---|---|---|
| 2,569,243 | 9/1951 | Kovacs | 55—500 X |
| 2,873,858 | 2/1959 | Urbon | 55—497 X |
| 2,884,091 | 4/1959 | Baldwin | 55—500 |
| 2,943,700 | 7/1960 | Bub | 55—500 |
| 3,057,481 | 10/1962 | Pall | 210—493 |
| 3,069,831 | 12/1962 | Young et al. | 55—521 |
| 3,150,945 | 9/1964 | Baggeson | 55—493 |
| 3,187,489 | 6/1964 | Bauder et al. | 55—500 X |

FOREIGN PATENTS

| | | |
|---|---|---|
| 727,975 | 4/1955 | Great Britain. |
| 880,812 | 10/1961 | Great Britain. |

ROBERT F. BURNETT, *Primary Examiner.*